(12) United States Patent
Nylander-Hill et al.

(10) Patent No.: US 9,019,639 B2
(45) Date of Patent: *Apr. 28, 2015

(54) HIERARCHICAL CONTROL OF TIERED ERROR RECOVERY FOR STORAGE DEVICES

(71) Applicant: International Business Machines Corporation, Armonk, NY (US)

(72) Inventors: Pamela R. Nylander-Hill, Tucson, AZ (US); Yutaka Oishi, Kanagawa (JP); Setsuko Masuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/218,735

(22) Filed: Mar. 18, 2014

(65) Prior Publication Data

US 2014/0198401 A1 Jul. 17, 2014

Related U.S. Application Data

(63) Continuation of application No. 13/271,888, filed on Oct. 12, 2011, now Pat. No. 8,717,698.

(51) Int. Cl.
*G11B 5/09* (2006.01)
*G11B 27/36* (2006.01)
*G11B 20/18* (2006.01)

(52) U.S. Cl.
CPC ............... *G11B 27/36* (2013.01); *G11B 20/18* (2013.01); *G11B 2020/183* (2013.01); *G11B 2220/90* (2013.01)

(58) Field of Classification Search
None
See application file for complete search history.

(56) References Cited

U.S. PATENT DOCUMENTS

| | | |
|---|---|---|
| RE30,187 E | 1/1980 | Hong et al. |
| 4,916,701 A | 4/1990 | Eggenberger et al. |
| 5,107,503 A | 4/1992 | Riggle et al. |
| 5,253,126 A | 10/1993 | Richmond |
| 5,404,248 A | 4/1995 | Shimoda et al. |
| 5,481,554 A | 1/1996 | Kondo |
| 5,986,835 A | 11/1999 | Tanaka et al. |
| 6,026,468 A | 2/2000 | Mase et al. |
| 6,128,147 A | 10/2000 | Ebata et al. |
| 6,344,941 B1 | 2/2002 | Katada et al. |

(Continued)

FOREIGN PATENT DOCUMENTS

EP 0 661 702 7/1995

OTHER PUBLICATIONS

"Enhanced Error Correction," IBM Technical Disclosure Bulletin, vol. 14, No. 11, Apr. 1972, pp. 3380-3381.

(Continued)

*Primary Examiner* — Regina N Holder
(74) *Attorney, Agent, or Firm* — Zilka-Kotab, PC

(57) ABSTRACT

A computer program product includes a computer readable storage medium having computer readable program code embodied therewith, the computer readable program code being executable by a processing circuit to cause the processing circuit to perform the following process. A data transfer operation is monitored for detecting one or more temps. A backhitch delay is set based at least in part on a post-recovery condition of a tape drive performing a portion of the data transfer operation. A backhitch is caused to be performed. At least one condition of the data transfer operation is altered after the backhitch delay.

13 Claims, 11 Drawing Sheets

(56) References Cited

U.S. PATENT DOCUMENTS

| | | |
|---|---|---|
| 6,512,644 B1 | 1/2003 | Hall et al. |
| 6,624,958 B1 | 9/2003 | Alva |
| 6,882,637 B1 | 4/2005 | Le et al. |
| 6,947,709 B2 | 9/2005 | Kaindl |
| 6,958,878 B2 | 10/2005 | Jaquette et al. |
| 7,069,473 B2 | 6/2006 | Yasuda |
| 7,206,151 B2 | 4/2007 | Kimura et al. |
| 7,225,366 B2 | 5/2007 | Arao et al. |
| 7,301,718 B2 | 11/2007 | Ballard |
| 7,496,696 B2 | 2/2009 | Katagiri et al. |
| 7,509,568 B2 | 3/2009 | Kapur et al. |
| 7,821,728 B2 | 10/2010 | Fry et al. |
| 7,870,442 B2 | 1/2011 | Gale et al. |
| 8,289,640 B2 | 10/2012 | Fry et al. |
| 8,416,519 B2 | 4/2013 | Fry et al. |
| 8,717,698 B2 | 5/2014 | Nylander-Hill et al. |
| 2002/0159180 A1 | 10/2002 | McAllister et al. |
| 2006/0005068 A1 | 1/2006 | Keeler et al. |
| 2006/0103961 A1 | 5/2006 | Sugawara et al. |
| 2006/0126211 A1 | 6/2006 | Sasaki |
| 2006/0238911 A1 | 10/2006 | MacKelden et al. |
| 2006/0256466 A1 | 11/2006 | Katagiri et al. |
| 2007/0014042 A1 | 1/2007 | Nylander-Hill et al. |
| 2010/0007978 A1 | 1/2010 | Fry et al. |
| 2010/0033861 A1 | 2/2010 | Fry et al. |
| 2011/0113284 A1 | 5/2011 | Park et al. |
| 2012/0275049 A1 | 11/2012 | Fry et al. |
| 2013/0094105 A1 | 4/2013 | Nylander-Hill et al. |

OTHER PUBLICATIONS

Combined Search and Examination report from British Application No. GB1217981.8 dated Feb. 8, 2013.

Non-Final Office Action from U.S. Appl. No. 13/271,888 dated Jun. 18, 2013.

Final Office Action from U.S. Appl. No. 131271,888 dated Nov. 6, 2013.

Notice of Allowance and Fee(s) Due from U.S. Appl. No. 13/271,888 dated Dec. 23, 2013.

Non-Final Office Action from U.S. Appl. No. 12/189,613 dated Feb. 16, 2011.

Non-Final Office Action from U.S. Appl. No. 12/189,613 dated Aug. 9, 2011.

Non-Final Office Action from U.S. Appl. No. 12/189,613 dated Jan. 18, 2012.

Notice of Allowance and Fee(s) Due from U.S. Appl. No. 12/189,613 dated Jun. 8, 2012.

Final Office Action from U.S. Appl. No. 13/546,973 dated Sep. 20, 2012.

Notice of Allowance and Fee(s) Due from U.S. Appl. No. 13/546,973 dated Dec. 7, 2012.

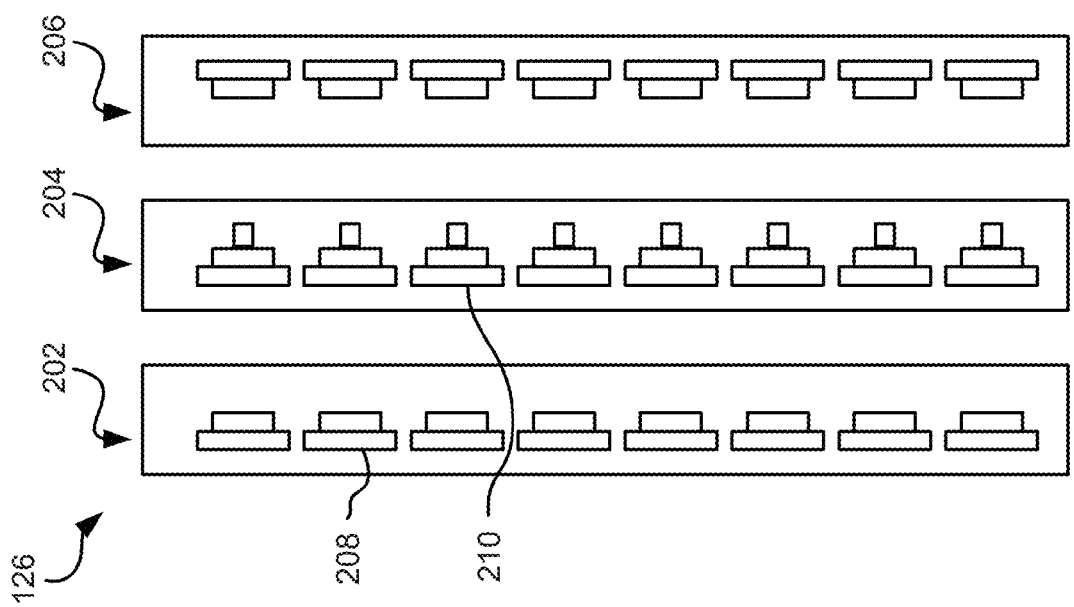
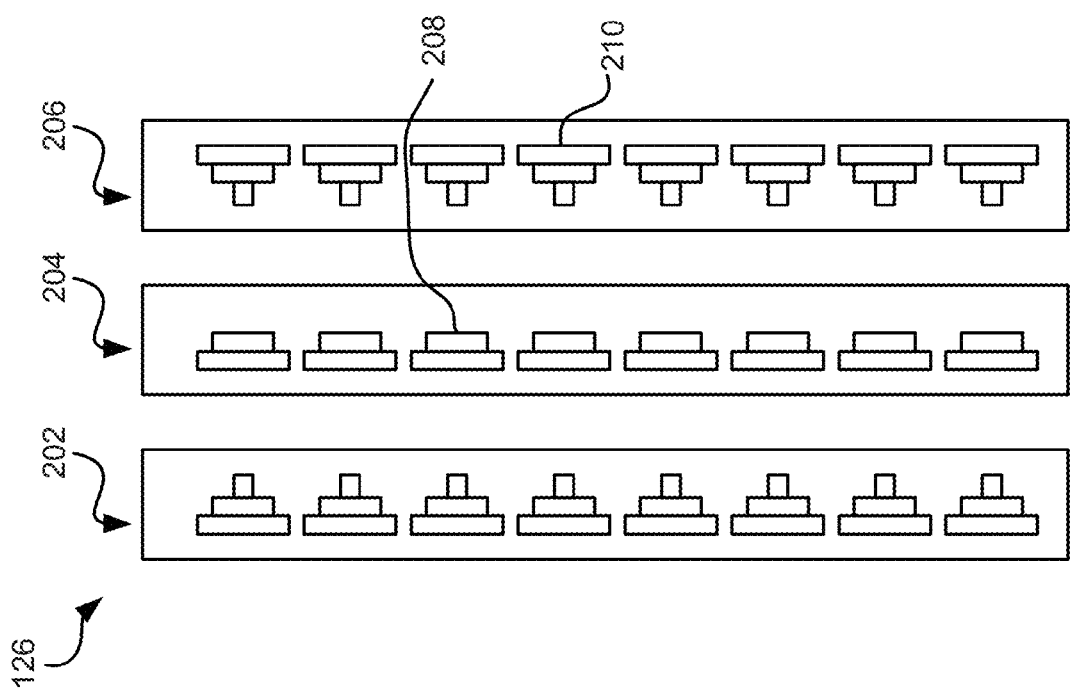

HIERARCHICAL CONTROL OF TIERED ERROR RECOVERY FOR STORAGE DEVICES

RELATED APPLICATIONS

This application is a continuation of U.S. patent application Ser. No. 13/271,888, filed Oct. 12, 2011, which is herein incorporated by reference.

BACKGROUND

The present invention relates to error detection, and more particularly, this invention relates hierarchical control of tiered error recovery for tape storage device.

Error detection and recovery is important to any system in which data passes from one point to another. Error detection and recovery is particularly important in the data storage industries, as users rely on the integrity of the stored data for everything from day to day operation to long term archiving. Tape drives require inline error recovery algorithms to recover errors during data processing.

In a field or test environment implementing a tape-based data storage system, situations may arise where successful inline recovery may still impact overall performance, as in the case of frequent error recovery known as an error burst. Error bursts, which may include a large number of errors in a given time frame or in a given length of tape in a given direction, are not easily identified since no permanent errors occur and data continues to transfer across the host/drive interface. Even if individual recovery is only transitory in nature, when it persists over long stretches of tape, these error bursts can lead to host command timeouts and excessive processing times that seriously degrade performance.

In order to enhance basic inline recovery, a tiered error recovery architecture performed by microcode may be used. Recovery tiers are delineated by context, scope, and functionality. Each tier uses different strategies and applies persistence methods in an effort to improve the error rate. However, since each tier has a different context and scope, their respective persistence methods can come into conflict, which causes recovery issues that must be dealt with.

BRIEF SUMMARY

In one embodiment, a computer program product includes a computer readable storage medium having computer readable program code embodied therewith, the computer readable program code being executable by a processing circuit to cause the processing circuit to perform the following process. A data transfer operation is monitored for detecting one or more temps within a sliding window, wherein the temps are selected from a group consisting of temporary errors and recovered temporary errors. Interference between first tier and second tier recovery methods is measured based on the monitoring. A backhitch delay is set based on conditions relating to the interference of first tier and second tier recovery methods as it relates to a determined error burst. A backhitch is caused to be performed. At least one condition of the data transfer operation is altered after the backhitch delay.

In another embodiment, a computer program product includes a computer readable storage medium having computer readable program code embodied therewith, the computer readable program code being executable by a processing circuit to cause the processing circuit to perform the following process. A data transfer operation is monitored for detecting one or more temps. A backhitch delay is set based at least in part on a post-recovery condition of a tape drive performing a portion of the data transfer operation. A backhitch is caused to be performed. At least one condition of the data transfer operation is altered after the backhitch delay.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

Figure 1:
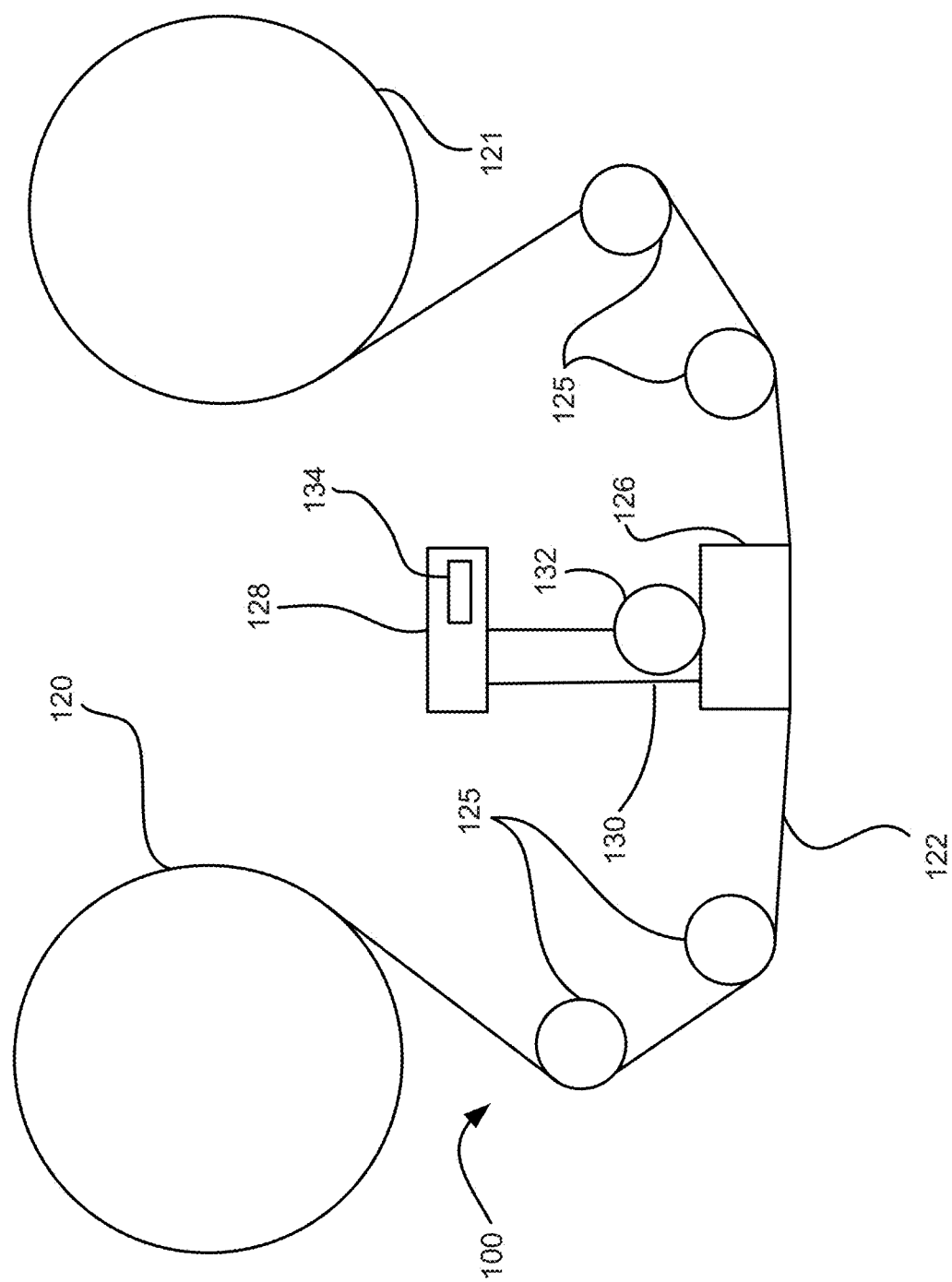
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a tape drive system includes a read channel configured for performing a portion of a data transfer operation, logic adapted for monitoring the data transfer operation for detecting one or more temps within a sliding window spanning a last group of datasets processed, logic adapted for measuring interference between first tier and second tier recovery methods based on the monitoring, logic adapted for setting a backhitch delay based on conditions relating to the interference of first tier and second tier recovery methods as it relates to a determined error burst, and logic adapted for performing a backhitch and altering at least one condition of the data transfer operation after the backhitch delay.

In another general embodiment, a method includes monitoring a data transfer operation for detecting one or more temps within a sliding window spanning a last group of datasets processed, measuring interference between first tier and second tier recovery methods based on the monitoring, setting a backhitch delay based on conditions relating to the interference of first tier and second tier recovery methods as it relates to a determined error burst, and performing a backhitch and altering at least one condition of the data transfer operation after the backhitch delay.

In another general embodiment, a computer program product includes a computer readable storage medium having computer readable program code embodied therewith. The computer readable program code includes computer readable program code configured for monitoring a data transfer operation for detecting one or more temps within a sliding window spanning a last group of datasets processed, computer readable program code configured for measuring interference between first tier and second tier recovery methods based on the monitoring, computer readable program code configured for setting a backhitch delay based on conditions relating to the interference of first tier and second tier recovery methods as it relates to a determined error burst, and computer readable program code configured for performing a backhitch and altering at least one condition of the data transfer operation after the backhitch delay.

In yet another general embodiment, a tape drive system includes a read channel configured for performing a portion of a data transfer operation, logic adapted for monitoring the data transfer operation for detecting one or more temps within a sliding window, logic adapted for measuring interference between first tier and second tier recovery methods based on the monitoring, logic adapted for setting a backhitch delay based on conditions relating to the interference of first tier and second tier recovery methods as it relates to a determined error burst, and logic adapted for performing a backhitch and altering at least one condition of the data transfer operation after the backhitch delay, wherein the backhitch delay is determined according to a backhitch delay count which is determined by a post-recovery condition of the tape drive, wherein when a post-recovery condition includes special conditions unrelated to error recovery, the backhitch delay following error recovery is set as either a normal backhitch delay or an immediate backhitch delay, wherein when a post-recovery condition includes a pending burst trigger condition the backhitch delay following error recovery is set as either an immediate backhitch delay upon the detection of a tight error burst or a short backhitch delay upon the detection of an error burst other than the tight burst, wherein when a post-recovery condition includes a burst method to be reasserted without a concurrent speed change the backhitch delay following error recovery is set as either: an immediate backhitch delay upon either the detection of the tight burst or when the sliding window contains three or more temps with unrestored burst methods, or a medium backhitch delay upon either the detection of an error burst other than the tight burst or when the sliding window detecting less than three temps with unrestored burst methods, wherein when a post-recovery condition includes a burst method to be reasserted with a concurrent speed change the backhitch delay following error recovery is set as either an immediate backhitch delay upon either the detection of the tight burst or when the sliding window contains three or more temps with unrestored burst methods, or a medium backhitch delay upon either the detection of an error burst other than the tight burst or when the sliding window contains less than three temps with unrestored burst methods, and wherein when a post-recovery condition includes a post-recovery effective speed differing from a speed requested in a speed matching code, the backhitch delay following recovery is set as a long backhitch delay.

According to one embodiment, there may be two tiers of error recovery in a tape drive. The first tier is a dynamic or inline error recovery tier, which commonly deals with the set of methods applied when a tape drive encounters errors on tape, from which a dataset may be recovered. This tier focuses on the recovery of a single dataset. However, since the source of an error may be related to localized debris or media damage, the first tier will often leave the successful hardware modification in place rather than initiate a backhitch to stop drive motion and reinstate nominal settings. This reduces the risk of unnecessary servo-pattern reacquisition and potentially decreases the possibility of error detection on neighboring datasets. Nominal hardware settings will be restored at the next natural break in tape motion. The second tier is a burst detection tier, where within a lengthy stretch of tape, the activities of the first tier may be monitored. Within a stretch of tape, if a high frequency of errors or of common methods used to recover those errors is detected, it is considered a burst, for which different recovery techniques may be applied as compared to a single or more isolated errors. Since inline recovery may take time to reach a recovery step which is perceived to be common or "most effective," burst detection may independently force that recovery step to be applied and held for further data processing on the wrap.

Since each tier may apply persistent options that stay active beyond the scope of a single dataset recorded on tape, it may happen that conflicting hardware settings are applied. To resolve tier conflicts, hierarchical control may be used for coherency and for a more effective interlock of action taken by other tiers. In the case of interfering scopes, burst logic has the widest view of the error burst and may override the persistence settings of inline error recovery in order to positively manage the different persistence windows: otherwise, the risk for tier logic is degraded performance due to false conclusions based on false assumptions.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
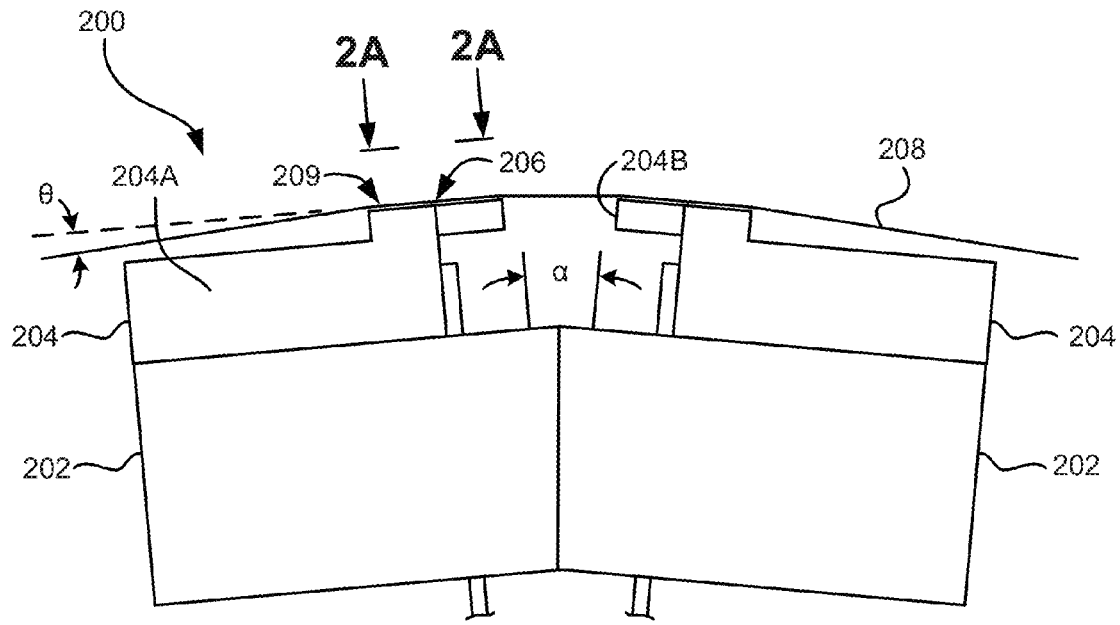
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo track readers for reading servo data on the medium.

Figure 2A:
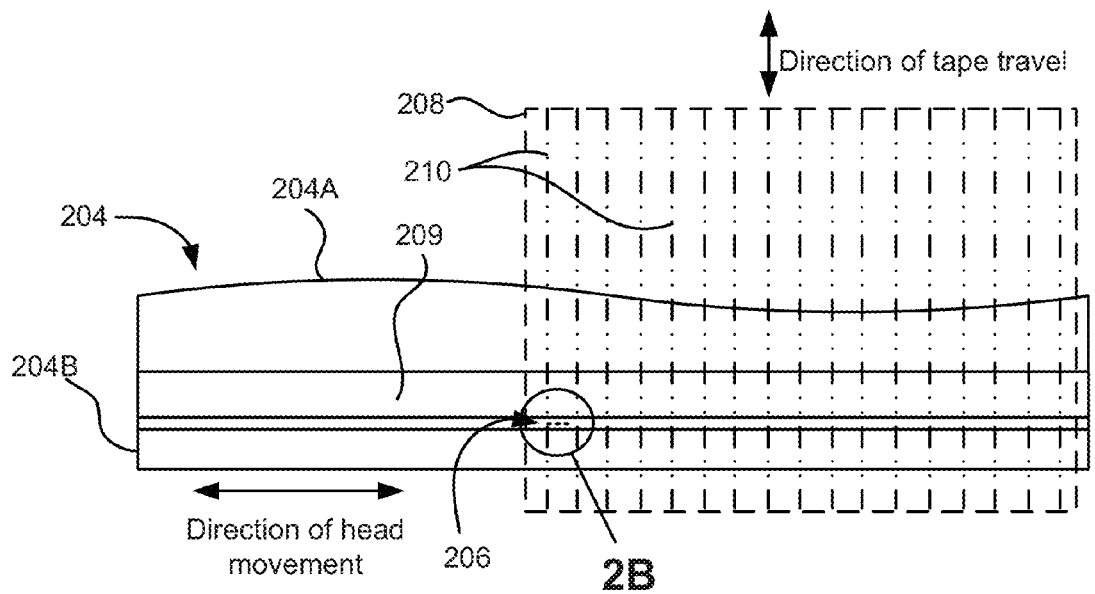
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 512 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
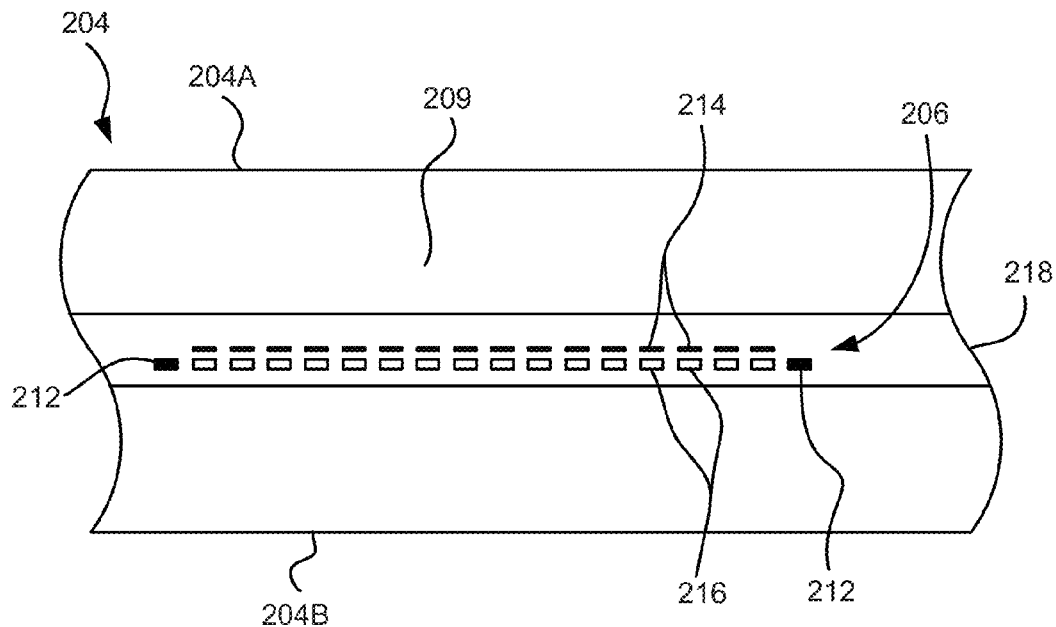
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
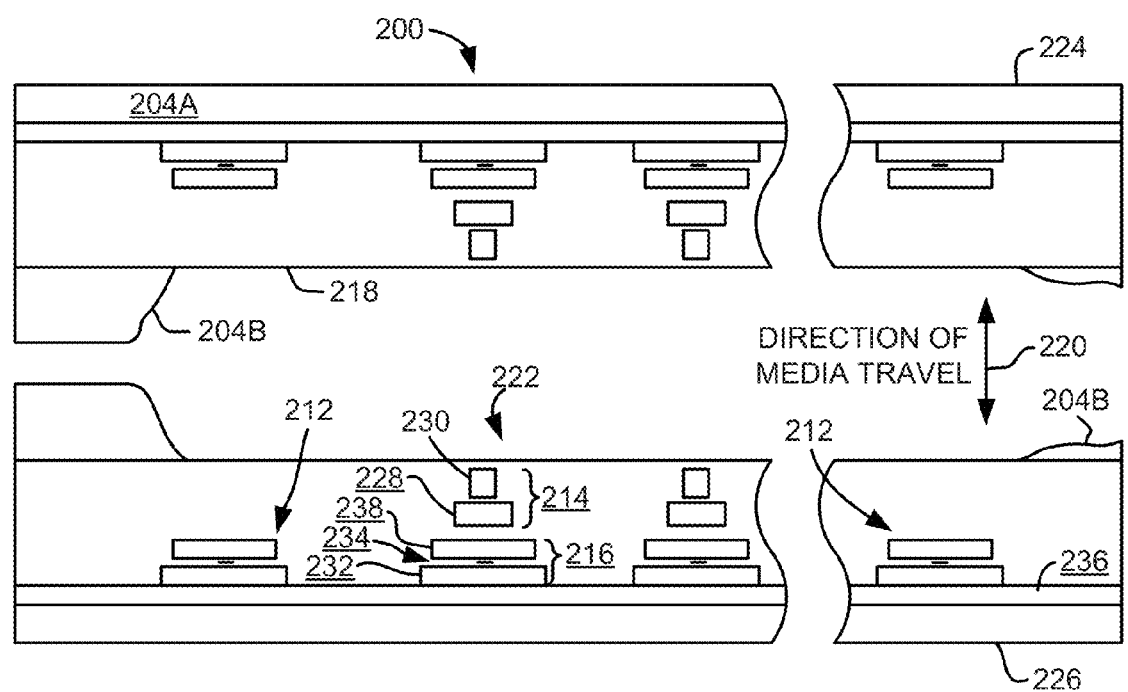
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 202, 206 each include one or more arrays of writers 210. The inner module 204 of FIG. 3 includes one or more arrays of readers 208 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
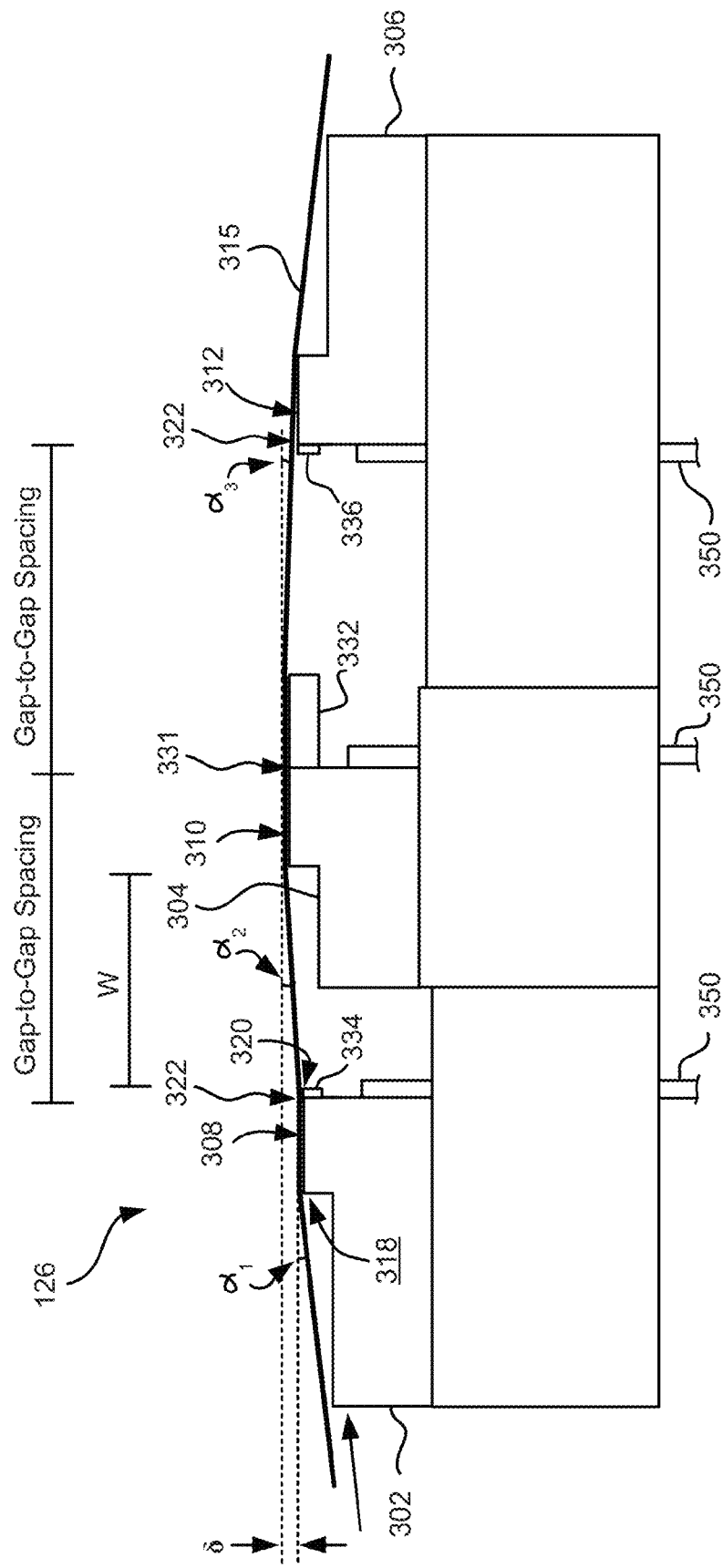
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
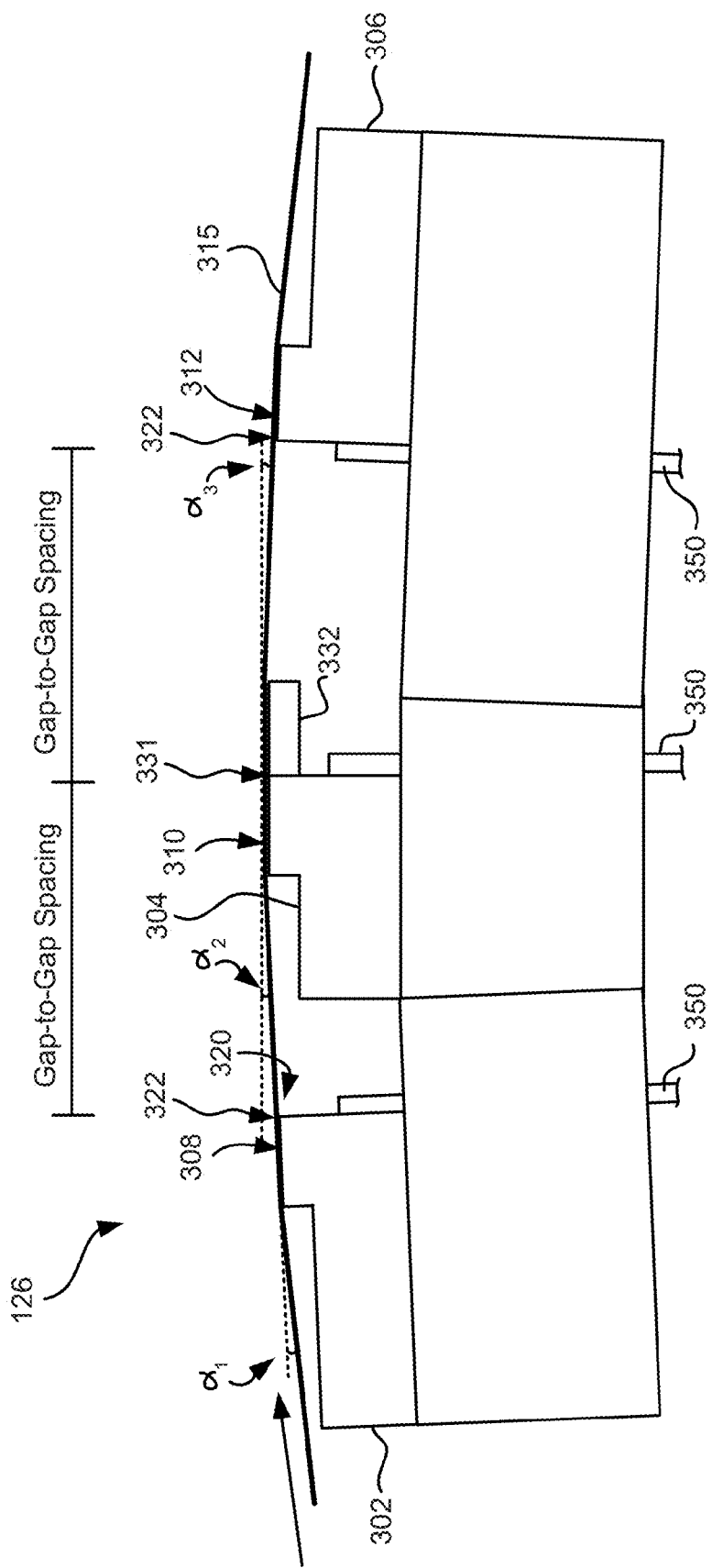
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
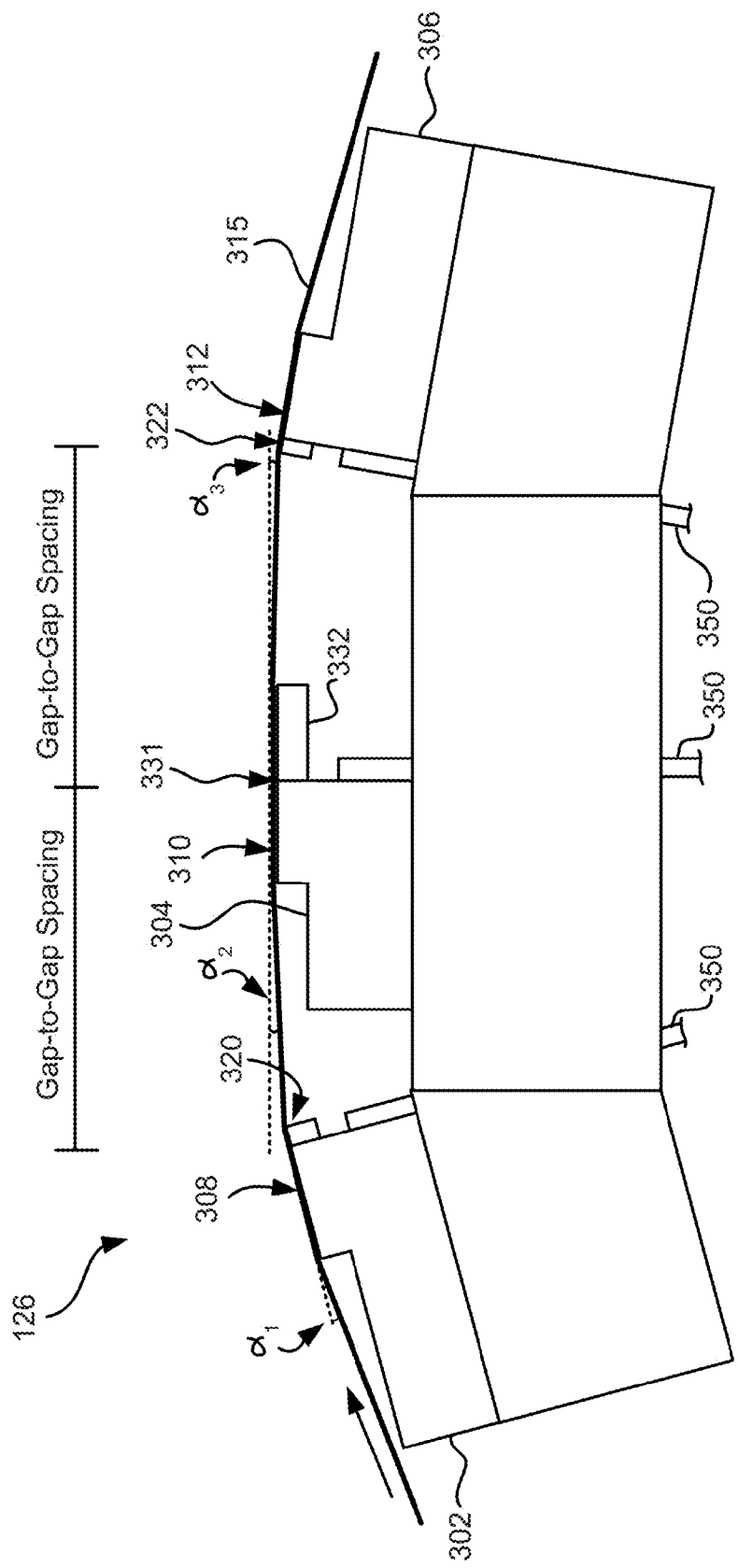
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

Figure 8:
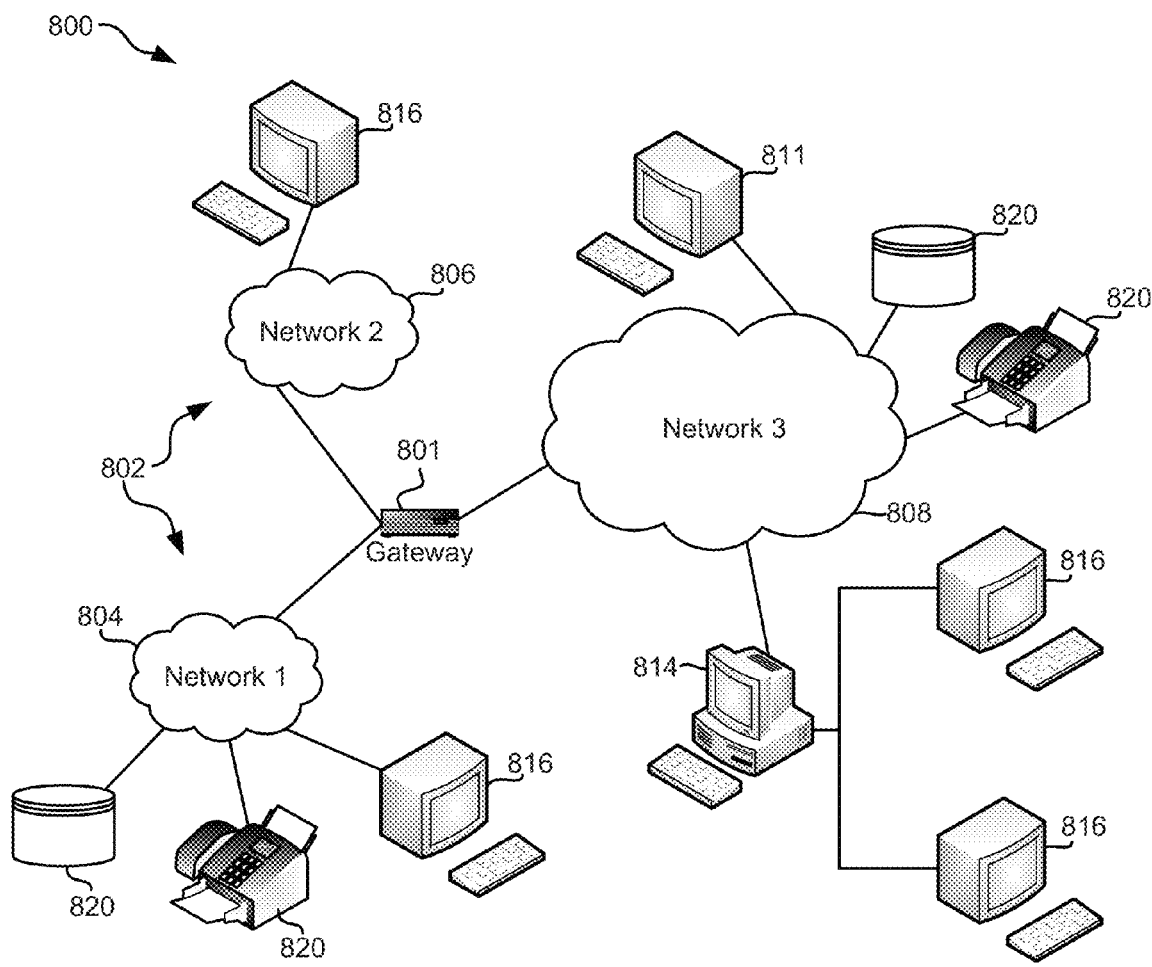
FIG. 8 shows a schematic of a network architecture, according to one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, PSTN, internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, lap-top computer, hand-held computer, printer or any other type of logic. It should be noted that a user device 811 may also be directly coupled to any of the networks, in one embodiment.

A peripheral 820 or series of peripherals 820, e.g., facsimile machines, printers, networked and/or local storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 9:
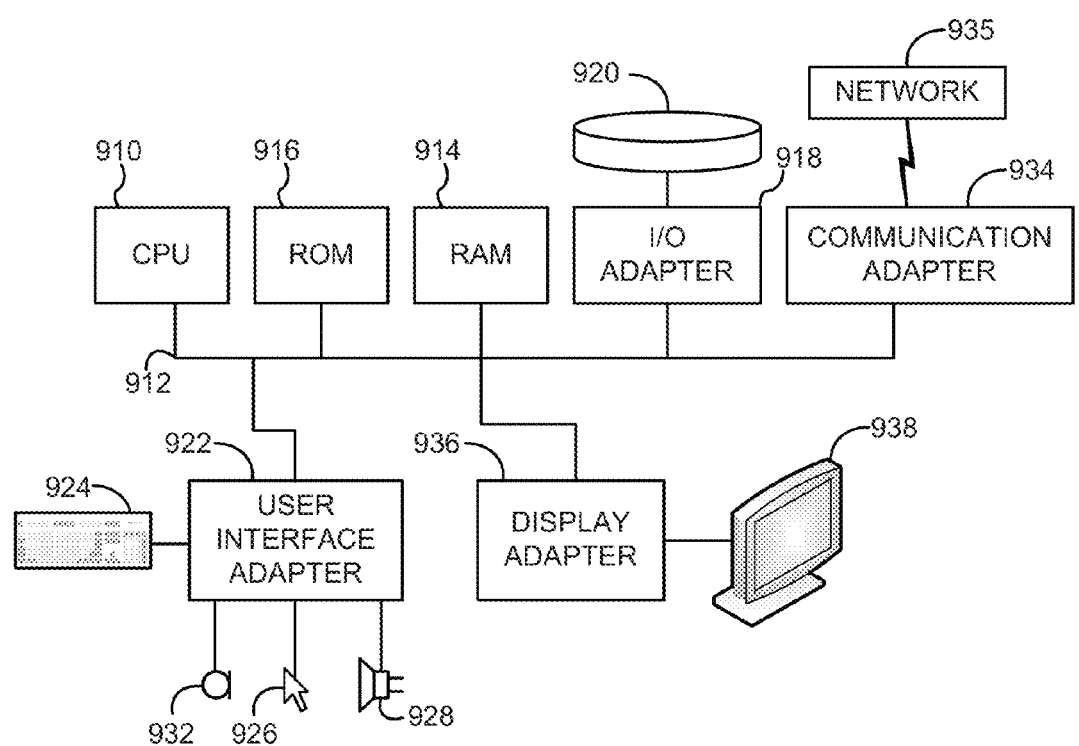
FIG. 9 shows various components comprising a network architecture, according to one embodiment.

FIG. 9 shows a representative hardware environment associated with a user device 816 and/or server 814 of FIG. 8, in accordance with one embodiment. Such figure illustrates a typical hardware configuration of a workstation having a central processing unit 910, such as a microprocessor, and a number of other units interconnected via a system bus 912.

The workstation shown in FIG. 9 includes a Random Access Memory (RAM) 914, Read Only Memory (ROM) 916, an I/O adapter 918 for connecting peripheral devices such as disk storage units 220 to the bus 912, a user interface adapter 922 for connecting a keyboard 924, a mouse 926, a speaker 928, a microphone 932, and/or other user interface devices such as a touch screen and a digital camera (not shown) to the bus 912, communication adapter 934 for connecting the workstation to a communication network 935 (e.g., a data processing network) and a display adapter 936 for connecting the bus 912 to a display device 938.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Referring now to the real-time error recovery functionality, in one embodiment, recovery of data on the first recovery tier may be used in the context of successfully writing or reading a single dataset from tape media to or from the data buffer. In the course of recovering correct encode of a given dataset, storage algorithms may include a wide range of optional sub-operations, such as recalibration of recording and servo channels, tape reposition, cartridge reloading, re-reading with alternate servo, dataflow, speed, or channel settings, etc. Moreover, in some embodiments, these options may be dynamically selected based on a detected error signature.

One implementation of the above described error recovery functionality may be to restore nominal operational values to various functional areas of a storage environment following a successful recovery of a given dataset "n". This recovery may have required multiple retries with different operational settings. Each retry requires a backhitch in order to reposition for a different recovery attempt. The recovered or temporary error on a given dataset is referred to as a temp event. This approach makes use of performing a backhitch on the storage environment after the last successful retry, reconfiguring the storage environment, and then restarting any data processing with a subsequent dataset "n+1," according to one embodiment. However, repeated pauses in streaming motion to resolve a detected error have in the past created additional problems, especially in sections of tape with media damage or debris where reacquiring of the servo signal may be problematic. So, the first recovery tier may opt to leave any hardware modifications in place and allow streaming motion to continue for subsequent read of datasets "n+1," "n+2," etc. Reapplication of default settings are deferred by the primary (or first tier) error recovery microcode to the next break in tape motion.

In the second tier of microcode logic, error bursts are being detected and resolved. At this higher level of recovery, when an error burst is detected, there is a forced stop in tape motion to assess the nature of the degradation and also review the recovery history pertaining to the current cartridge mount. This directional history includes all data processing and error recovery performed while the cartridge has been loaded in the tape drive. Second tier recovery then performs or applies a single recovery option before the resumption of data processing. Whereas first tier recovery options persist only until the first backhitch or break in motion, the second recovery tier options have a longer persistence interval. These options are reapplied between temp errors and persist until a new burst condition is detected or until processing on this wrap completes. The two tiers work together, the first tier being more focused on resolving localized defects whereas the second tier is more focused on lowering the overall temp rate where possible. It has been found that there are conflicts in which tier is getting priority. If a large number of temps occur in close proximity, then the burst settings are never reapplied. This conflict is counterintuitive in itself, as the reduction of temps is a desired outcome. Therefore, a set of algorithms is provided that manages these two tiers and the priority of their respective persistent settings.

In some approaches, the operational context of first tier real-time error recovery is best applied to single dataset recovery, where excessive backhitch can disadvantageously lead to unnecessary servo acquisition errors and performance issues. Moreover, since first tier real-time error recovery may be local in scope, successful operational changes which may be applied to a given dataset may actually improve processing of neighboring datasets. Accordingly, first tier real-time error recovery logic allows for streaming and read/write operations to continue following successful recovery, thereby leaving active any alternate settings that were in effect at the time of recovery. This advantageous persistence stays in effect until the next error occurs or until the next break in motion, according to one embodiment.

Referring now to error burst detection recovery functionality, the second storage tier recovery approach may be used in the context of managing error bursts. Error bursts degrade performance and can lead to command timeouts. As described herein, "error bursts" may be understood as an excessively recovered error count as measured across a limited distance in a given direction.

Generally speaking, data may be recorded longitudinally on a tape in a serpentine motion from beginning of tape to end of tape. Moreover, each end-to-end pass is defined as a physical wrap. Forward direction wraps process data from beginning of tape to end of tape, while reverse direction wraps process data from end of tape to beginning of tape. Furthermore, a cartridge may contain a variable number of wraps depending on format and capacity.

Burst detection is based on a defined set of thresholds or triggers that monitor the temp rate in a given direction down the tape, according to one embodiment. Depending on any number of factors, such as the number of datasets that make up that trigger distance, what burst action has been taken since the last trigger, the number of triggers that have occurred, etc., the burst detection logic may take one or more of a variety of actions. All triggers may reset on load, wrapturn, and/or on reposition.

Upon reaching a predetermined number of temps, an error burst may be called. Again, a temporal and/or spatial limitation may also be applied in determining whether an error burst has occurred.

In one illustrative embodiment, used in the following example, assume that twelve temps on a given wrap must occur before a burst can be identified. This is the default trigger.

At any given time, the burst trigger threshold may be set to either the default or an accelerated value. If a burst trigger has tripped, but more than 200 datasets have been processed since the last trigger (or if no trigger, 200 datasets from the first temp on the current wrap), then the burst trigger may be ignored. The temp error counters are reset and burst detection is deferred to the next trigger. If a prior wrap in the same direction has already experienced an error burst, then the last option that was selected on that prior wrap becomes the first option to be selected on this new wrap. Further changes may progress from that starting point, in one approach.

In some approaches, an accelerated threshold may be used in the determination of whether another error burst has occurred, the accelerated threshold having less temporary errors than a threshold used in the first determining operation. Continuing with the illustrative example, assume under the accelerated threshold, six temps on a given wrap must occur before a burst may be identified. The accelerated trigger is enabled by one or more of the following conditions. It is disabled (default trigger restored) when more than 100 datasets have been processed since the last trigger.

Clusters: the last burst trigger and the current burst trigger each spanned <50 datasets.

Dynamic: an error burst has been detected and a second tier option applied, but after 6 temps less than 25 datasets have been read. Since a second tier option could be ineffective or potentially make the error burst worse, this accelerated trigger allows for rapid sequencing to the next second tier option. Other criteria, such as a recognized error signature, may also cause a dynamic trigger.

Time: if an error burst condition exists and read/write processing on this wrap has exceeded 40 minutes but is not due to a slow host (>25% of this time must have been involved in error recovery).

Positioning Read: Space or locate is in progress. The host command timeouts are shorter than for read/write, so burst detection is made more sensitive.

Forced Speed Change: A section of the second tier option table is involved in imposing various speed changes. Since these could aggravate the temp rate, burst detection is forced to use an accelerated trigger in order to correct for a poor performing selection.

Write Sync/Flush: Host command timeouts are shorter so burst detection is made more sensitive.

Preferably, an error code is generated if the data transfer operation in a single wrap exceeds a predefined time limit. More preferably, an error code that terminates further processing is generated if the data transfer operation in a single wrap exceeds a predefined time limit and a predefined portion of the time limit is spent in error recovery on that wrap. For example, in cases of read/write error bursts on a given wrap which are not responsive to first tier changes, excessive recovery may be terminated by forcing a permanent error with a unique fsc. The drive/cartridge can then be pulled for failure analysis and feedback for possible improvement to burst management algorithms. On detection of a burst condition, if the time-in-wrap has exceeded some predefined time limit, e.g., 40 minutes, then a perm error may be forced. To compensate for slower systems, the time involved in error recovery may be considered. For example, the aforementioned perm error may be forced only if >25% of that time is involved in error recovery. When near end-of-wrap (EOW), the excessive recovery timeout may be deferred to allow host processing to continue. This may be done because error bursts are often directional in nature, so that on wrapturn nominal R/W performance typically resumes. The determination of "near-EOW" varies depending on such things as capacity scaling where the full wrap length is not used.

In some embodiments, the directional nature of second tier error recovery follows the generality that the magnetic head has two sets of recording channels, one for each direction. Second storage tier error burst recovery may manage error bursts in the context of either or both a direction and a mode (e.g., read vs. write). Its scope covers all data processing and any first storage tier real-time error recovery performed while the cartridge remains loaded. There is some overlap in first storage tier real-time error recovery and second storage tier error burst recovery methods, but second storage tier error burst recovery has a much smaller set of available options, in some approaches. When an error burst is detected, second storage tier error burst recovery algorithms may assess the nature of the burst and review directional history. This directional history includes successful and unsuccessful data related to speeds, past first storage tier real-time error recoveries, past second storage tier error burst recovery experiences, channel calibrations performed, etc. Second storage tier error burst recovery may impose a change to normal operation that will persist until a next error burst, wrap change, reposition, or mode change, in some approaches. Second storage tier error burst recovery persistence is intentionally longer than first storage tier real-time error recovery in one embodiment and, if successful, re-asserts itself if a similar error burst re-occurs on a subsequent wrap in the same direction, in one embodiment.

A basic problem with any control scheme is to positively manage the persistence behavior of the two tiers of error recovery. In one embodiment, a hierarchical control algorithm is provided which manages the persistence behavior of the two tiers of error recovery.

As referenced herein, a burst method may be understood to refer to a method of managing persistence behavior in the presence of and in combination with first tier error recovery in systems according to the present description. Also, as referenced herein, backhitch thresholds are a protocol used to limit first tier persistence by forcing a break in streaming after a predetermined number of datasets following dataset 'n' upon which successful first tier recovery had been performed. A normal backhitch recovery may be understood to refer to a backhitch delay according to protocol DS_COUNT_NORMAL, as shown in Table 1. Similarly, an immediate backhitch delay may be understood to mean a backhitch threshold according to protocol DS_COUNT_IMMED_BACKHITCH as shown in Table 1. Furthermore, a medium backhitch delay may be understood to refer to a backhitch threshold according to protocol DS_COUNT_MEDIUM_DELAY_BACKHITCH, as shown in Table 1. Further still, a long backhitch delay may be understood to mean a backhitch threshold according to protocol DS_COUNT_LONG_DELAY_BACKHITCH, as shown in Table 1.

The normal expectation of burst methods is that they will be immediately re-applied after a temp, since its scope is reducing the overall error rate. This naturally conflicts with first storage tier real-time error recovery persistence which, although focused on single dataset recovery, is configured to continue streaming with the last successful set of modifications applied. The risk in a burst scenario is that if burst methods are not re-applied immediately or very shortly following a temp, then the burst monitoring logic no longer functions correctly and, worse, comes to false conclusions based on false assumptions. Accordingly, in one embodiment, a hierarchical scheme is asserted to resolve the conflict of interfering scopes and persistence windows.

According to one embodiment, a primary control mechanism to restore default settings following first tier recovery or to alternately apply second tier settings under burst conditions, is the timing delay of a first backhitch following successful recovery of a dataset. Based on a set of criteria and rules, a backhitch delay count may be established to best deal with the persistence goals of tiered error recovery. When a backhitch occurs, normal operating values may be applied and then a query may be made to see if any burst settings should be applied. In one embodiment, there are a range of backhitch delay counts defined, which are listed below.

DS_COUNT_NORMAL=0 (continue streaming, unspecified dataset count)

DS_COUNT_IMMED_BACKHITCH=1 (backhitch after next dataset)

DS_COUNT_SHORT_DELAY_BACKHITCH=2 (backhitch after 2 datasets)

DS_COUNT_MEDIUM_DELAY_BACKHITCH=5 (backhitch after 5 datasets)

DS_COUNT_LONG_DELAY_BACKHITCH=50 (backhitch after 50 datasets)

Of course, any number of delay counts may be used, with each delay count handling a different situation, scenario, circumstance, etc., as would be understood by one of skill in the art upon reading the present descriptions.

In one embodiment, the persistence control algorithm makes backhitch delay decisions based on any number of criteria. Burst detection may or may not be active at the time a dataset has been recovered. If it is active, then the nature of the burst as well as the error rate may be analyzed, according to one approach.

Bursts are classified into two categories: normal and tight. In general, tight bursts are assessed across a span of 25 datasets, whereas normal bursts span 200 datasets. Accelerated burst thresholds are active during tight bursts. Of course, these values may be altered according to the desires of the entity using the embodiments and approaches described herein, as would be understood by one of skill in the art upon reading the present descriptions. There may be other special cases for tight bursts (for example, when positioning during write flush), as would be known in the art. A tight burst may change classification to be rated a normal burst, and vice versa, based on a changing error rate, in some approaches.

Figure 10A:
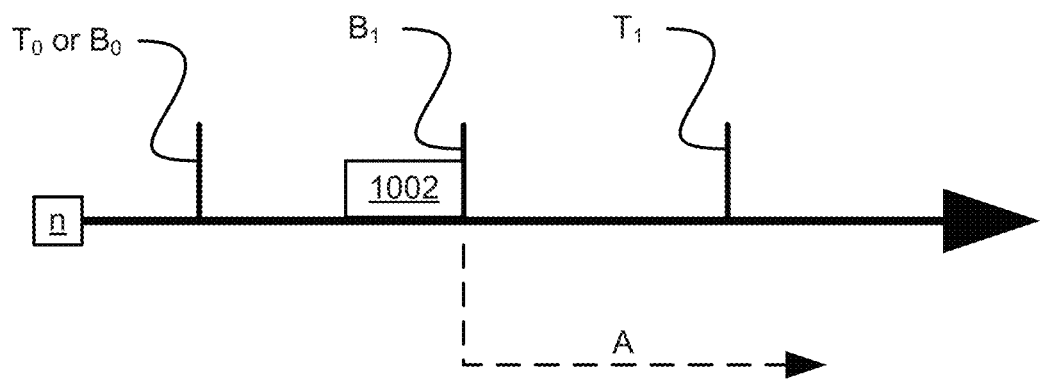
FIG. 10A shows a diagram of burst classifications, according to one embodiment.

Now referring to FIG. 10A, a diagram of burst classifications is shown according to one embodiment. In FIG. 10A, dsnum is a dataset number, and temp is a recovered or temporary error on a given dataset. $T_0$ is the dsnum of the first temp and $B_0$ is the last burst trigger, both of which may be used as a starting point.

A tight burst $B_1$ is indicated by n temps 1002 following $T_0/B_0$ with a change in dsnum of less than 25, i.e., $\Delta dsnum<25$. According to various embodiments, n may be any integer greater than 0, such as 2, 4, 6, 12, etc. In one embodiment, n is 6. Once a tight burst has been detected, if any temp (e.g., temp $T_1$) has a $\Delta dsnum$ from $B_1$ which is greater than 100, then burst modification is considered successful and the tight burst converts to a normal burst for future consideration. The $B_1$ dsnum is modified to equal the $T_1$ dsnum. Despite the classification change, the burst modification stays persistent until the next burst trigger, wrap change, etc.

Figure 10B:
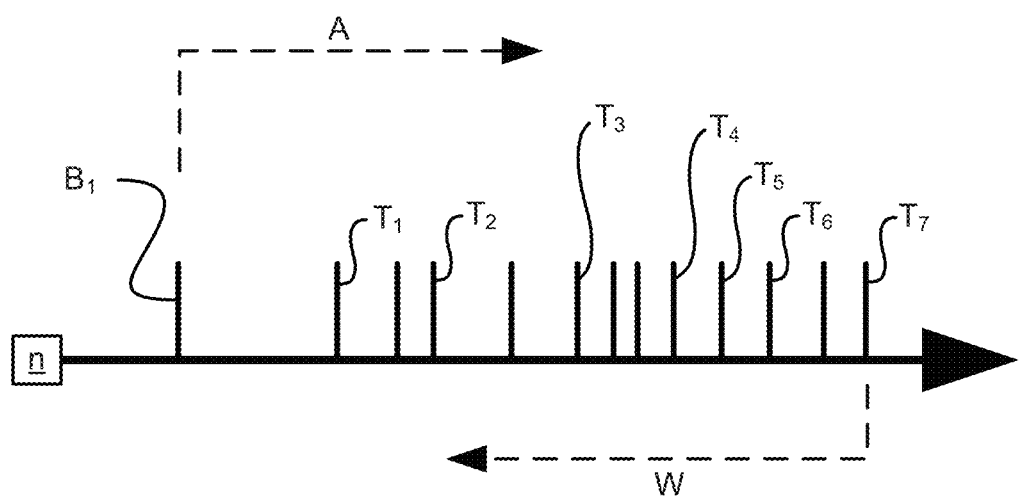
FIG. 10B shows a diagram of burst classifications in a sliding window, according to one embodiment.

Furthermore, a normal burst B1 is indicated by m temps 1002 following $T_0/B_0$ with a change in dsnum of less than 200, i.e., $\Delta dsnum<200$. According to various embodiments, m may be any integer greater than n, such as 6, 10, 12, 20, etc. In one embodiment, m is 12. Once a normal burst has been detected, if any temp (e.g., temp $T_1$) has a $\Delta dsnum$ from $B_1$ which is greater than 200, then burst modification is considered successful. The $B_1$ dsnum is modified to equal the $T_1$ dsnum and the burst modification remains persistent until the next burst trigger, wrap change, etc. Subsequent normal data sets are indicated as vertical lines with no marker, while subsequent temps are indicated as $T_1, T_2, \ldots, T_n$. As shown in FIG. 10B, temps $T_4$-$T_6$ occur without any normal data sets in-between, which constitutes an error burst.

When there is active burst detection concurrent with dataset error recovery, backhitch control may be affected by many criteria, in various embodiments. Burst persistence algorithms monitor error rate changes. In one embodiment, in cases of tight bursts, the algorithms will assume that the burst modification was either unsuccessful or made matters worse. So, in cases of tight bursts, burst recovery will make fast changes. However, it can also happen that the error rate is slowing, but insufficient data has been collected to make a change in the burst assessment. With a slowing error rate, a short backhitch delay is not always justified even when an active error burst exists. So, the persistence manager makes use of a sliding window which monitors the density of recovered temps that may or may not have occurred over the last n datasets read or written from tape. n may be any integer greater than 0, such as 2, 4, 6, 12, etc. In one embodiment, n is 6. The density of the error rate over this sliding window combined with concurrent first tier real-time error recovery and second tier error burst recovery may be used to determine the backhitch delay. Depending on the temp frequency or density within this sliding window, the backhitch delay may be altered.

First storage tier real-time error recovery setting persistence may defer the reinstatement of second storage tier error burst recovery setting persistence since a backhitch must occur to stop streaming motion and allow a query for persistent burst settings. When this second storage tier error burst recovery deferral occurs in a very tight burst (e.g., a recovered error every dataset or every other dataset), the persistent burst settings never gets reapplied. Note that an active error burst implies a high rate of localized temporary errors, where second storage tier error burst recovery algorithms are enabled in an attempt to eliminate or lower the error rate. When second storage tier error burst recovery persistent settings are not restored due to first storage tier real-time error recovery persistence, then the two persistence methodologies come into direct conflict.

The hierarchical persistence manager uses the sliding window to assess what is being enforced at both levels of recovery and to adjust the backhitch delays accordingly. Using the sliding window, if second storage tier error burst recovery methods are active and the number of first storage tier real-time error recovery recovered errors that began without second storage tier error burst recovery persistence settings restored is equal to three or more, then an immediate backhitch is requested, according to one embodiment.

Now referring to FIG. 10B, a diagram of burst classifications is shown according to one embodiment. As in FIG. 10A, dsnum is a dataset number, and temp is a recovered or temporary error on a given dataset. To is the dsnum of the first temp and $B_0$ is the last burst trigger, both of which may be used as a starting point.

Moreover, in addition to FIG. 10A, FIG. 10B particularly showcases the features of a sliding window W, according to one embodiment. Specifically, a sliding window as shown in FIG. 10B contains the six most recent datasets processed. None, some, or all of these datasets may have experienced temps ($T_2$-$T_7$). In some embodiments, when the number of temps included within a sliding window across the last six datasets is three or more, then the first tier recovery process likely initiated with unrestored persistent burst settings, and a shorter backhitch delay may be requested accordingly.

In Table 1, various conditions which request different backhitch delay counts are shown according to one embodiment.

TABLE 1

| Post-Recovery Condition | Backhitch Delay Following Recovery |
|---|---|
| Special conditions unrelated to error recovery | DS_COUNT_NORMAL DS_COUNT_IMMED_BACKHITCH |
| Pending burst trigger condition | If tight burst→DS_COUNT_IMMED_BACKHITCH, else→DS_COUNT_SHORT_DELAY_BACKHITCH |
| Burst method to be reasserted which does not involve speed change | If tight burst or if sliding window contains 3 or more temps with unrestored burst methods→DS_COUNT_IMMED_BACKHITCH, else→DS_COUNT_MEDIUM_DELAY_BACKHITCH |
| Burst method to be reasserted involves speed change which is different from that now in effect following successful recovery | if tight burst or if sliding window contains 3 or more temps with unrestored burst methods→DS_COUNT_IMMED_BACKHITCH, else→DS_COUNT_MEDIUM_DELAY_BACKHITCH |
| Speed in effect following successful recovery does not match that requested | DS_COUNT_LONG_DELAY_BACKHITCH |
| Other (default setting) | DS_COUNT_NORMAL |

Figure 11:
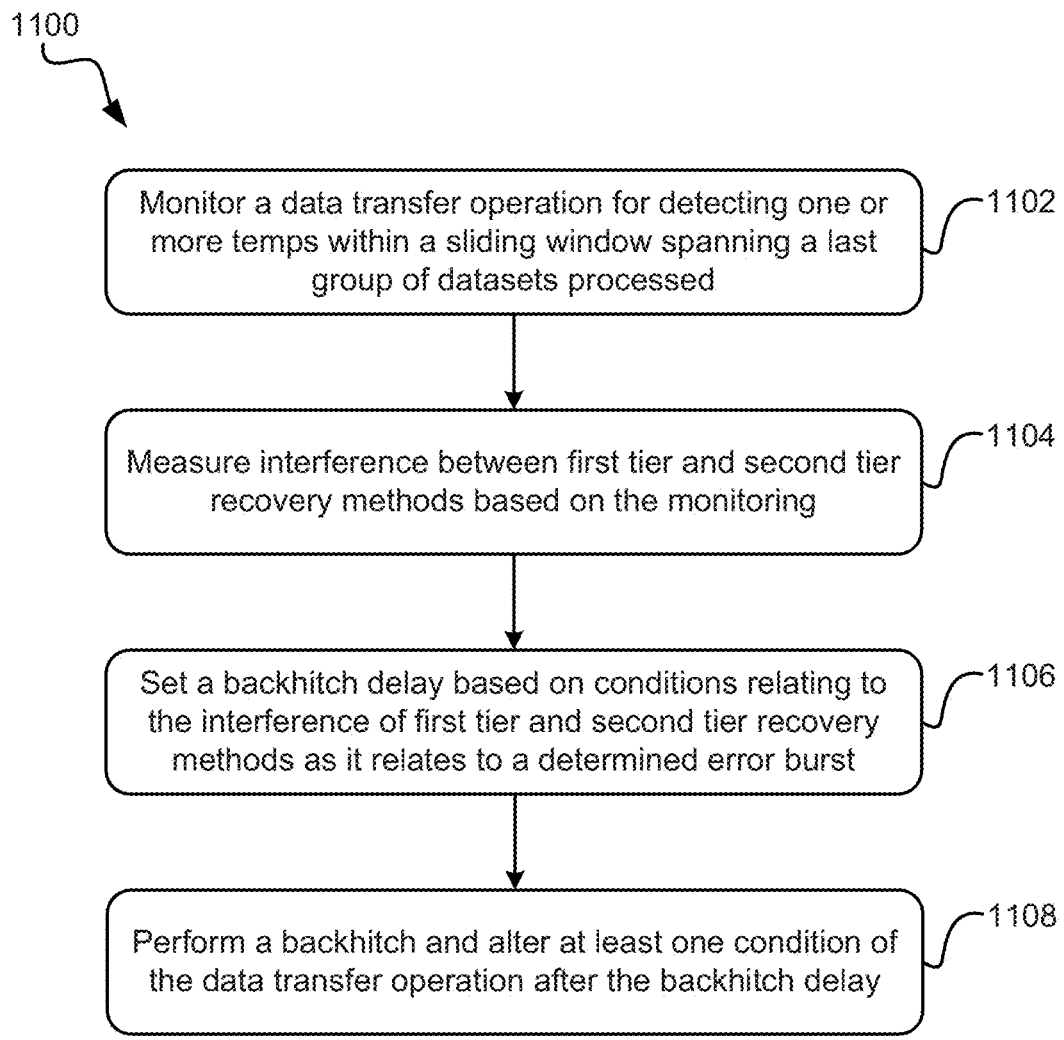
FIG. 11 is a flowchart of a method, according to one embodiment.

Now referring to FIG. 11, a method 1100 is shown according to one embodiment. The method 1100 may be carried out in any desired environment, including those shown in FIGS. 1-10B, among others, as would be understood by one of skill in the art upon reading the present descriptions. More or less operations than those specifically described in relation to FIG. 11 may be included in method 1100, according to various embodiments.

In operation 1102, a data transfer operation is monitored for detecting one or more temps within a sliding window spanning a last group of datasets processed. A temp may be a recovered temporary error or a temporary error, as would be understood by one of skill in the art. The data transfer operation may be from a tape drive to another storage system, from a storage system to a tape drive, between tape drives, etc., according to various embodiments. The monitoring may be performed using a routine, a real-time monitoring, synchronous monitoring, asynchronous monitoring, computer readable program code configured for monitoring, logic of the tape drive, logic of a storage controller, etc., according to various embodiments.

The sliding window, according to one embodiment, is a temporal construct configured to include the last "n" datasets and a number of "m" temps experienced by those "n" datasets, where n is any integer greater than zero, such as 2, 4, 6, 10, 12, etc., and "m" is a similar integer that may include zero or greater. This sliding window can be analyzed to determine a pattern of temps, tendency of temps, frequency of temps, distance between temps, etc., in order to more accurately control the interaction between first tier and second tier methods, according to various embodiments.

In operation 1104, the monitoring of the sliding window is a measure of the interference between first tier and second tier recovery methods. This determination may be made based on the number of temps in the sliding window, the frequency of temps in the sliding window, the prediction of future temps, etc., as would be understood by one of skill in the art upon reading the present descriptions.

In operation 1106, a backhitch delay is set based on conditions relating to the interference of first tier and second tier recovery methods as it relates to a determined error burst, as would be understood by one of skill in the art upon reading the present descriptions.

In one embodiment, the backhitch delay, which is a maximum distance in units of datasets processed after which a backhitch must occur, may be set according to a set of predetermined conditions. In one specific embodiment, the backhitch delay may be set according to Table 1. Of course, any of the values described in Table 1 may be changed, optimized, modified, or otherwise altered according to preference, experience, or knowledge available to one of skill in the art.

In one embodiment, the backhitch delay may be determined according to a backhitch delay count, which may be in seconds, milliseconds, nanoseconds, etc., as well as units of distance, such as a distance related to a predetermined dataset count.

In a further embodiment, the backhitch delay count may be determined by a post-recovery condition of a tape drive performing a portion of the data transfer operation, such as special conditions unrelated to error recovery, whether the backhitch delay following error recovery is a normal backhitch delay or an immediate backhitch delay, etc.

In another embodiment, when a post-recovery condition comprises a pending burst trigger condition, the backhitch delay following error recovery may be set as an immediate backhitch delay upon the detection of a tight error burst. Also, in this embodiment, when the post-recovery condition comprises the pending burst trigger condition, the backhitch delay following error recovery may be set as a short backhitch delay upon the detection of an error burst other than a tight burst.

In yet another embodiment, when a post-recovery condition comprises a burst method to be reasserted without a concurrent speed change the backhitch delay following error recovery may be set as an immediate backhitch delay upon the detection of a tight burst. Also, when the post-recovery condition comprises the burst method to be reasserted without the concurrent speed change the backhitch delay following error recovery may be set as the immediate backhitch delay upon the sliding window detecting three or more temps which initiated with unrestored burst methods. Furthermore, when the post-recovery condition comprises the burst method to be reasserted without the concurrent speed change the backhitch delay following error recovery may be set as a medium backhitch delay upon the detection of an error burst other than the tight burst and upon the sliding window detecting less than three temps with unrestored burst methods.

According to another embodiment, when a post-recovery condition comprises a burst method to be reasserted with a concurrent speed change the backhitch delay following error recovery may be set as an immediate backhitch delay upon the detection of a tight burst. Also, when the post-recovery condition comprises the burst method to be reasserted with the concurrent speed change the backhitch delay following error recovery may be set as the immediate backhitch delay when the sliding window contains three or more temps with unrestored burst methods. Furthermore, when the post-recovery condition comprises the burst method to be reasserted with the concurrent speed change the backhitch delay following error recovery may be set as a medium backhitch delay upon the detection of an error burst other than the tight burst. Moreover, when the post-recovery condition comprises the burst method to be reasserted with the concurrent speed change the backhitch delay following error recovery may be set as the medium backhitch delay when the sliding window contains less than three temps with unrestored burst methods.

In yet another embodiment, when a post-recovery condition comprises a post-recovery effective speed differing from a speed requested in a speed matching code, the backhitch delay following recovery may be set as a long backhitch delay.

In operation 1108, a backhitch is performed and at least one condition of the data transfer operation is altered after the backhitch delay. The backhitch is performed after the backhitch delay, unless, as in some approaches, the backhitch delay is reset to a longer time according to another encountered temp or temp burst.

The backhitch is performed for a number of datasets, for a length of tape, or for any other distance of tape as would be apparent to one of skill in the art in order to precede the dataset onto which recovery is to be performed.

Any condition of the data transfer may be altered, such as transfer speed, transfer word length, error reporting, or any other condition as would be apparent to one of skill in the art.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

For example, in one embodiment a computer program product as recited herein may be characterized by a backhitch delay count determined by a post-recovery condition of the tape drive, and wherein the post-recovery condition includes at least one of: a burst method to be reasserted with a concurrent speed change; a burst method to be reasserted without a concurrent speed change; a pending burst trigger condition; one or more special conditions unrelated to error recovery; and a post-recovery effective speed differing from a speed requested in a speed matching code.

For example, in one embodiment, a tape drive system comprises a tape medium adapted for storing data thereto, logic adapted for monitoring a data transfer operation for detecting one or more temps within a sliding dataset window, logic adapted for determining occurrence of an error burst based on the monitoring, logic adapted for setting a backhitch delay based on conditions relating to the determined error burst, and logic adapted for performing a backhitch and altering at least one condition of the data transfer operation after the backhitch delay. Of course, any of the embodiments and/or approaches described above in relation to FIG. 11 apply equally to the tape drive system.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data, in particular one or more read channels of a system as described herein likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product comprising a non-transitory computer readable storage medium having computer readable program code embodied therewith, the computer readable program code being executable by a processing circuit to cause the processing circuit to:
- monitor a data transfer operation for detecting one or more with temporary errors within a sliding window, wherein the with temporary errors are selected from a group consisting of temporary errors and recovered temporary errors;
- measure interference between first tier and second tier recovery methods based on the monitoring;
- set a backhitch delay based on conditions relating to the interference of first tier and second tier recovery methods as it relates to a determined error burst;
- cause performance of a backhitch; and
- alter at least one condition of the data transfer operation after the backhitch delay.

2. The computer program product as recited claim 1, wherein the backhitch delay is determined according to a backhitch delay count.

3. A computer program product as recited in claim 2, wherein the backhitch delay count is determined by a post-recovery condition of a tape drive performing a portion of the data transfer operation.

4. A computer program product as recited in claim 3, wherein when the post-recovery condition comprises special conditions unrelated to error recovery, the backhitch delay following error recovery is set as either a normal backhitch delay or an immediate backhitch delay.

5. A computer program product as recited in claim 3, wherein when the post-recovery condition comprises a pending burst trigger condition the backhitch delay following error recovery is an immediate backhitch delay upon the detection of a tight error burst, and
- wherein when the post-recovery condition comprises the pending burst trigger condition the backhitch delay following error recovery is set as a short backhitch delay upon the detection of an error burst other than the tight burst.

6. A computer program product as recited in claim 3, wherein when the post-recovery condition comprises a burst method to be reasserted without a concurrent speed change the backhitch delay following error recovery is set as an immediate backhitch delay upon the detection of a tight burst,
- wherein when the post-recovery condition comprises the burst method to be reasserted without the concurrent speed change the backhitch delay following error recovery is set as the immediate backhitch delay upon the sliding window detecting three or more with temporary errors with unrestored burst methods, and
- wherein when the post-recovery condition comprises the burst method to be reasserted without the concurrent speed change the backhitch delay following error recovery is set as a medium backhitch delay upon the detection of an error burst other than the tight burst and upon the sliding window detecting less than three with temporary errors with unrestored burst methods.

7. A computer program product as recited in claim 3, wherein when the post-recovery condition comprises a burst method to be reasserted with a concurrent speed change the backhitch delay following error recovery is set as an immediate backhitch delay upon the detection of a tight burst,
- wherein when the post-recovery condition comprises the burst method to be reasserted with the concurrent speed change the backhitch delay following error recovery is set as the immediate backhitch delay when the sliding window contains three or more with temporary errors with unrestored burst methods,
- wherein when the post-recovery condition comprises the burst method to be reasserted with the concurrent speed change the backhitch delay following error recovery is set as a medium backhitch delay upon the detection of an error burst other than the tight burst, and
- wherein when the post-recovery condition comprises the burst method to be reasserted with the concurrent speed change the backhitch delay following error recovery is set as the medium backhitch delay when the sliding window contains less than three with temporary errors with unrestored burst methods.

8. A computer program product comprising a non-transitory computer readable storage medium having computer readable program code embodied therewith, the computer readable program code being executable by a processing circuit to cause the processing circuit to:
- monitor a data transfer operation for detecting one or more with temporary errors;
- set a backhitch delay based at least in part on a post-recovery condition of a tape drive performing a portion of the data transfer operation;
- cause performance of a backhitch; and
- alter at least one condition of the data transfer operation after the backhitch delay.

9. The computer program product as recited claim 8, wherein the at least one condition of the data transfer operation is set during the backhitch, wherein the at least one condition of the data transfer operation is reverted to a default setting after the backhitch delay.

10. A computer program product as recited in claim 8, wherein when the post-recovery condition comprises special conditions unrelated to error recovery, the backhitch delay following error recovery is set as either a normal backhitch delay or an immediate backhitch delay.

11. A computer program product as recited in claim 8, wherein when the post-recovery condition comprises a pending burst trigger condition the backhitch delay following error recovery is an immediate backhitch delay upon the detection of a tight error burst, and
- wherein when the post-recovery condition comprises the pending burst trigger condition the backhitch delay following error recovery is set as a short backhitch delay upon the detection of an error burst other than the tight burst.

12. A computer program product as recited in claim 8, wherein when the post-recovery condition comprises a burst method to be reasserted without a concurrent speed change the backhitch delay following error recovery is set as an immediate backhitch delay upon the detection of a tight burst,
- wherein when the post-recovery condition comprises the burst method to be reasserted without the concurrent speed change the backhitch delay following error recovery is set as the immediate backhitch delay upon detecting three or more with temporary errors with unrestored burst methods in a sliding window spanning a last group of datasets processed, and
- wherein when the post-recovery condition comprises the burst method to be reasserted without the concurrent speed change the backhitch delay following error recovery is set as a medium backhitch delay upon the detection of an error burst other than the tight burst and upon the sliding window detecting less than three with temporary errors with unrestored burst methods.

13. A computer program product as recited in claim 8, wherein when the post-recovery condition comprises a burst method to be reasserted with a concurrent speed change the backhitch delay following error recovery is set as an immediate backhitch delay upon the detection of a tight burst,
- wherein when the post-recovery condition comprises the burst method to be reasserted with the concurrent speed change the backhitch delay following error recovery is set as the immediate backhitch delay when a sliding window spanning a last group of datasets processed contains three or more temps with unrestored burst methods,
- wherein when the post-recovery condition comprises the burst method to be reasserted with the concurrent speed change the backhitch delay following error recovery is set as a medium backhitch delay upon the detection of an error burst other than the tight burst, and
- wherein when the post-recovery condition comprises the burst method to be reasserted with the concurrent speed change the backhitch delay following error recovery is set as the medium backhitch delay when the sliding window contains less than three temps with unrestored burst methods.

* * * * *